(12) United States Patent
Haeseker et al.

(10) Patent No.: US 10,494,033 B2
(45) Date of Patent: Dec. 3, 2019

(54) WHEEL WELL COVER FOR A MOTOR VEHICLE, AND MOTOR VEHICLE EQUIPPED THEREWITH

(71) Applicant: Bayerische Motoren Werke Aktiengesellschaft, Munich (DE)

(72) Inventors: Daniel Haeseker, Munich (DE); Victor Kuehn, Munich (DE); Nico Daun, Podsdam (DE); Seungmo Lim, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/976,292

(22) Filed: May 10, 2018

(65) Prior Publication Data
US 2018/0257716 A1    Sep. 13, 2018

Related U.S. Application Data

(63) Continuation of application No. PCT/EP2016/077051, filed on Nov. 9, 2016.

(30) Foreign Application Priority Data

Nov. 11, 2015   (DE) .................. 10 2015 222 174

(51) Int. Cl.
*B62D 25/18*    (2006.01)
*B62D 25/16*    (2006.01)
(Continued)

(52) U.S. Cl.
CPC .............. *B62D 25/186* (2013.01); *B60B 7/00* (2013.01); *B62D 25/161* (2013.01);
(Continued)

(58) Field of Classification Search
CPC .. B62D 25/182; B62D 25/186; B62D 25/161; B62D 25/163; B62D 25/166; B60B 7/00
See application file for complete search history.

(56) References Cited

U.S. PATENT DOCUMENTS

| 2,017,227 A | 10/1935 | Barnhart |
| 3,784,226 A | 1/1974 | Wilfert et al. |

(Continued)

FOREIGN PATENT DOCUMENTS

| DE | 2 147 750 A1 | 3/1973 |
| DE | 103 12 089 A1 | 10/2004 |

(Continued)

OTHER PUBLICATIONS

International Search Report (PCT/ISA/210) issued in PCT Application No. PCT/EP2016/077051 dated Feb. 1, 2017 with English translation (eight pages).

(Continued)

*Primary Examiner* — Brian L Swenson
(74) *Attorney, Agent, or Firm* — Crowell & Moring LLP

(57) ABSTRACT

An optically and aerodynamically improved body for a motor vehicle has a wheel well cover with at least one wheel well for receiving a wheel. The wheel well cover is designed in such a way as to be adjustable by an adjusting mechanism in accordance with the wheel angle, and includes at least two ring portions which surround part of the wheel and which are arranged in such a way as to be movable at least partially into each other and at least partially relative to one another.

17 Claims, 5 Drawing Sheets

(51) Int. Cl.
*B62D 35/00* (2006.01)
*B60B 7/00* (2006.01)
(52) U.S. Cl.
CPC ......... *B62D 25/163* (2013.01); *B62D 25/166* (2013.01); *B62D 25/182* (2013.01); *B62D 35/008* (2013.01)

(56) References Cited

U.S. PATENT DOCUMENTS

| | | | | |
|---|---|---|---|---|
| 6,007,102 | A * | 12/1999 | Helmus | B62D 25/182 280/847 |
| 8,979,102 | B1 * | 3/2015 | Prentice | B62D 35/00 280/124.1 |
| 2010/0217490 | A1 * | 8/2010 | Canfield | B62D 25/16 701/49 |
| 2011/0080019 | A1 * | 4/2011 | Castillo | B62D 25/16 296/180.1 |
| 2012/0013113 | A1 * | 1/2012 | Trenne | B62D 25/182 280/849 |
| 2013/0096781 | A1 * | 4/2013 | Reichenbach | B60Q 1/326 701/49 |

FOREIGN PATENT DOCUMENTS

| | | |
|---|---|---|
| DE | 10 2008 046 314 A1 | 6/2009 |
| DE | 10 2010 047 311 A1 | 4/2011 |
| EP | 1 529 721 A1 | 5/2005 |
| EP | 2 050 661 A1 | 4/2009 |
| FR | 2 987 804 A1 | 9/2013 |
| JP | 59-192677 A | 11/1984 |
| JP | 59-192678 A | 11/1984 |
| WO | WO 2016/197161 A1 | 12/2016 |

OTHER PUBLICATIONS

German-language Written Opinion (PCT/ISA/237) issued in PCT Application No. PCT/EP2016/077051 dated Feb. 1, 2017 (seven pages).

German-language Search Report issued in counterpart German Application No. 10 2015 222 174.1 dated Jul. 18, 2016 with partial English translation (13 pages).

* cited by examiner

WHEEL WELL COVER FOR A MOTOR VEHICLE, AND MOTOR VEHICLE EQUIPPED THEREWITH

CROSS REFERENCE TO RELATED APPLICATIONS

This application is a continuation of PCT International Application No. PCT/EP2016/077051, filed Nov. 9, 2016, which claims priority under 35 U.S.C. § 119 from German Patent Application No. 10 2015 222 174.1, filed Nov. 11, 2015, the entire disclosures of which are herein expressly incorporated by reference.

BACKGROUND AND SUMMARY OF THE INVENTION

The present invention relates to a wheel well cover for a motor vehicle and to a motor vehicle which is equipped with such a wheel well cover.

DE 10 2008 046 314 A1 discloses a wheel well cover for a motor vehicle. The vehicle includes a vehicle body with at least one wheel well for receiving a wheel. It is possible for the wheel well cover, which has at least one segment, to be adjusted by way of an adjusting device in a manner which is dependent on the wheel angle. A detailed illustration of an apparatus which makes the adjustment in a wheel angle-dependent manner possible cannot be gathered from this prior art document.

It is an object of the present invention to overcome the disadvantages of the prior art.

This and other objects are achieved by way of a wheel well cover for a motor vehicle which comprises a vehicle body, which wheel well cover can be adjusted by an adjusting device in a manner which is dependent on the wheel angle. The wheel well cover has at least two ring sections which surround part of the wheel and which are arranged such that they can be moved at least partially into one another and at least partially relative to one another.

In this way, a continuous wheel well cover, which can be adjusted in a manner which is dependent on the wheel angle and has a simple construction, is provided in an advantageous way. Moreover, the wheel well cover can be adapted in a simple way to the geometry of a wheel well by way of a corresponding configuration of the shape, the size and/or the number of ring sections. It is to be noted in this context that a ring section can be configured substantially as a circular ring or else can also have another geometry, said ring section not making contact with the ground, on which a motor vehicle which is equipped correspondingly is situated. As a consequence, the circular ring is not closed completely.

In accordance with one preferred embodiment, the ring sections extend in the lateral direction substantially in the wheel transverse direction. As a result, the required structural volume for a wheel well cover is advantageously reduced, in particular in the case of straight ahead driving of a motor vehicle which is equipped accordingly.

In each case two adjacent ring sections are advantageously connected to one another by way of a connecting device, since no separate actuation of all the individual ring sections is required as a result. In particular, it is possible as a result to connect adjacent ring sections in series to one another in a simple way.

In accordance with one particularly preferred embodiment, the connecting means has at least one spring, with the result that tolerance compensation between individual ring sections is provided in a simple way. Moreover, the vibration behavior of the wheel well cover can be influenced in a positive way by way of the selection of suitable springs. It is thus possible, in particular, to configure a spring as a compression spring, a torsion spring or a tension spring, in order to reduce or even to completely avoid an undesired acoustically and/or visually perceptible vibration of the wheel well cover overall or of the individual constituent parts thereof.

Particularly simple and secure guiding of a ring section is achieved if the ring section is mounted on at least one guide. In a particularly advantageous way, the guide can include a guide rail which is fastened to the vehicle body and on which the ring section is mounted displaceably.

The stability of the wheel well cover according to the invention is improved further in an advantageous way if a first guide is situated in the wheel front region and a second guide is situated in the wheel rear region. As viewed in the main driving direction of the motor vehicle, the wheel front region itself is situated in front of the wheel, whereas the wheel rear region is situated behind the wheel.

In order to improve the aesthetic appearance of the wheel well cover according to the invention and/or its aerodynamic properties, in particular with regard to a reduction of the air resistance of the wheel well cover, it can be provided that the wheel well cover comprises a wheel spat which extends on the vehicle body outer side.

Both the visual integrity of the wheel well cover and the wheel spat and the aerodynamic properties of the wheel well cover according to the invention are improved further if said wheel well cover is connected at least in sections to at least one ring section.

This applies all the more so if the wheel spat is mounted on the guide and/or is fastened to a wheel support.

The air resistance of the wheel well cover according to the invention is reduced further in an advantageous way if the wheel spat has an aerodynamic structure which reduces the air resistance, in particular an air duct. In a particularly preferable way, the air duct extends in the wheel spat substantially in the vertical direction, with the result that the area, through which flow passes, and therefore the volumetric flow which is conveyed through the air duct are increased in a manner which reduces the air resistance.

For the purpose of assistance of the movement of the wheel well cover, it is provided in accordance with one advantageous refinement of the invention that the wheel well cover is operatively connected to at least one actuator. The actuator can particularly advantageously comprise a slotted guide which is operatively connected to the guide rail. Moreover, a prestressing device can advantageously be provided, which prestressing device is operatively connected to the guide rail and/or the slotted guide and a ring section. In a particularly advantageous way, the operative connection which was mentioned last consists of fixing of the damping means on the ring section which lies closest to it and for its part is the innermost ring section of all the ring sections as viewed in the vehicle transverse direction.

In an advantageous way, the actuator has a bracket which is connected at one end on the wheel support and at the other end to a ring section; as a result, a particularly simple and reliable mechanical embodiment of the apparatus according to the invention is provided.

In a particularly advantageous way, a wheel well shell can be provided on the wheel well cover between the wheel and at least one portion of the ring sections. As a result, the aerodynamics of the wheel well cover and therefore of a motor vehicle which is equipped with it are improved further. Moreover, the wheel well cover serves as a dirt intercepting structure, with the result that dirt which is whirled up by the wheel cannot adhere to the ring sections. As a result, the functionality of the wheel well cover according to the invention is improved further, in particular in the case of winter road conditions.

In an advantageous way, the wheel well cover, in particular at least one ring section and/or the wheel spat, can be configured from metal, in particular from steel, aluminum or a corresponding alloy, from plastic and/or from a fiber composite material which can comprise, in particular, glass fibers and/or carbon fibers. As a result, firstly the necessary mechanical requirements of the wheel well cover can be fulfilled; secondly, said materials or material mixes permit a high amount of design freedom. It is thus possible in an advantageous way, in particular, to adapt one, a plurality of (or all) ring sections of the wheel well cover according to the invention completely or partially to the vehicle body in a desired way in a visual manner, in particular in terms of color or with regard to the texture of visible surfaces.

The abovementioned object is likewise achieved by way of a motor vehicle having the features of the previously disclosed wheel well cover. The corresponding advantages apply appropriately.

Other objects, advantages and novel features of the present invention will become apparent from the following detailed description of one or more preferred embodiments when considered in conjunction with the accompanying drawings.

BRIEF DESCRIPTION OF THE DRAWINGS

With reference to FIGS. 1 to 5, a detailed, non-prejudicial, in particular non-restrictive description of exemplary embodiments of the present invention is given in the following text. Identical elements are provided with identical designations unless otherwise stated.

DETAILED DESCRIPTION OF THE DRAWINGS

Figure 1:
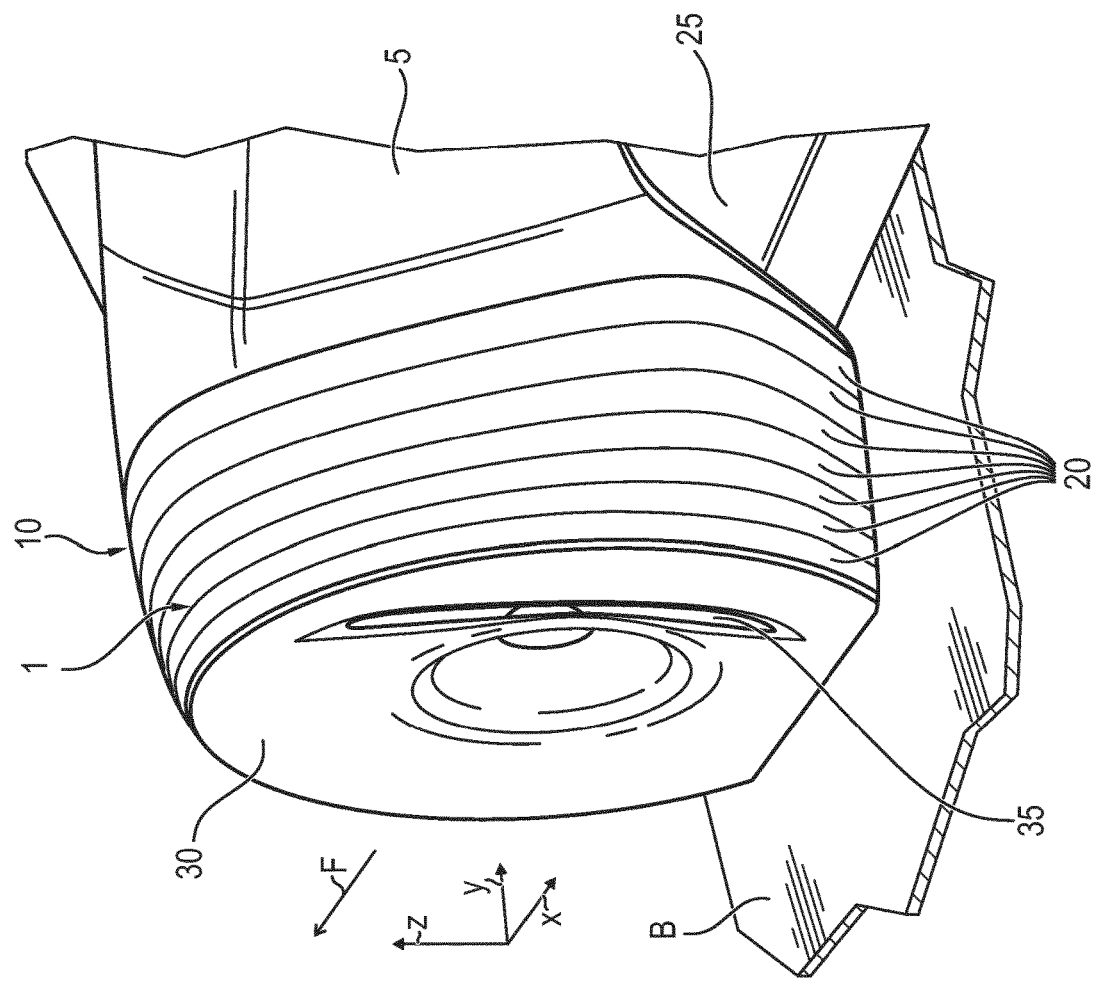
FIG. 1 is a perspective side view of a wheel well cover according to an embodiment of the invention in a non-deployed state with a viewing direction toward a front region of a motor vehicle from the rear.

FIG. 1 is a perspective view of a wheel well cover 1 which is situated on a motor vehicle 5. The wheel well cover 1 is shown in a non-deployed state, that is to say the wheel 15 which is situated in the wheel well 10 (cf. FIG. 2) is oriented such that, as viewed in the main driving direction F, the motor vehicle 5 would drive straight ahead.

As can be gathered from FIG. 1, the wheel well cover 1 has a series of ring sections 20 which, as viewed in the vehicle transverse direction y, are situated next to one another and are arranged around the wheel 15. In the exemplary embodiment which is shown here, there are seven ring sections 20 which are of substantially circularly annular configuration, but the outer design of one or more ring sections 20, in particular its or their width (that is to say, their dimension in the y-direction), its or their radius, and their number can be selected freely in principle. It is thus also possible, in particular, to select a design of a ring section 20 which differs from a circular shape. As can be gathered from FIG. 1, each ring section 20 has a different inclination with respect to the x-y plane and the x-z plane. Moreover, a ring section 20 can be of inclined or crossed configuration within itself. As a result, it is possible in an advantageous way to provide an aesthetically pleasing and flush appearance of the wheel well cover 1.

On its region which is spaced apart furthest from a motor vehicle body 25 of the motor vehicle 5, a wheel spat 30 is situated on the wheel well cover 1. The wheel spat 30 covers the wheel 15 in a manner known per se. The wheel spat 30 which is shown here is distinguished by an aerodynamic structure 35 which is configured as an air duct and through which air can flow during the operation of the motor vehicle 5 according to the invention. The result is that the air resistance of the motor vehicle 5 is reduced in an advantageous way.

It goes without saying that the wheel well cover 1 can move freely with respect to the roadway surface B. For this reason, in the exemplary embodiment which is shown here, a spacing is provided between the lower region (shown in FIG. 1) of the ring sections 20 and/or the wheel spat 30 and the roadway surface B. The magnitude of the spacing can be selected, in particular, in a manner which is dependent on the diameter of the wheel 15 and a desired overhang angle of the motor vehicle 5.

Figure 2:
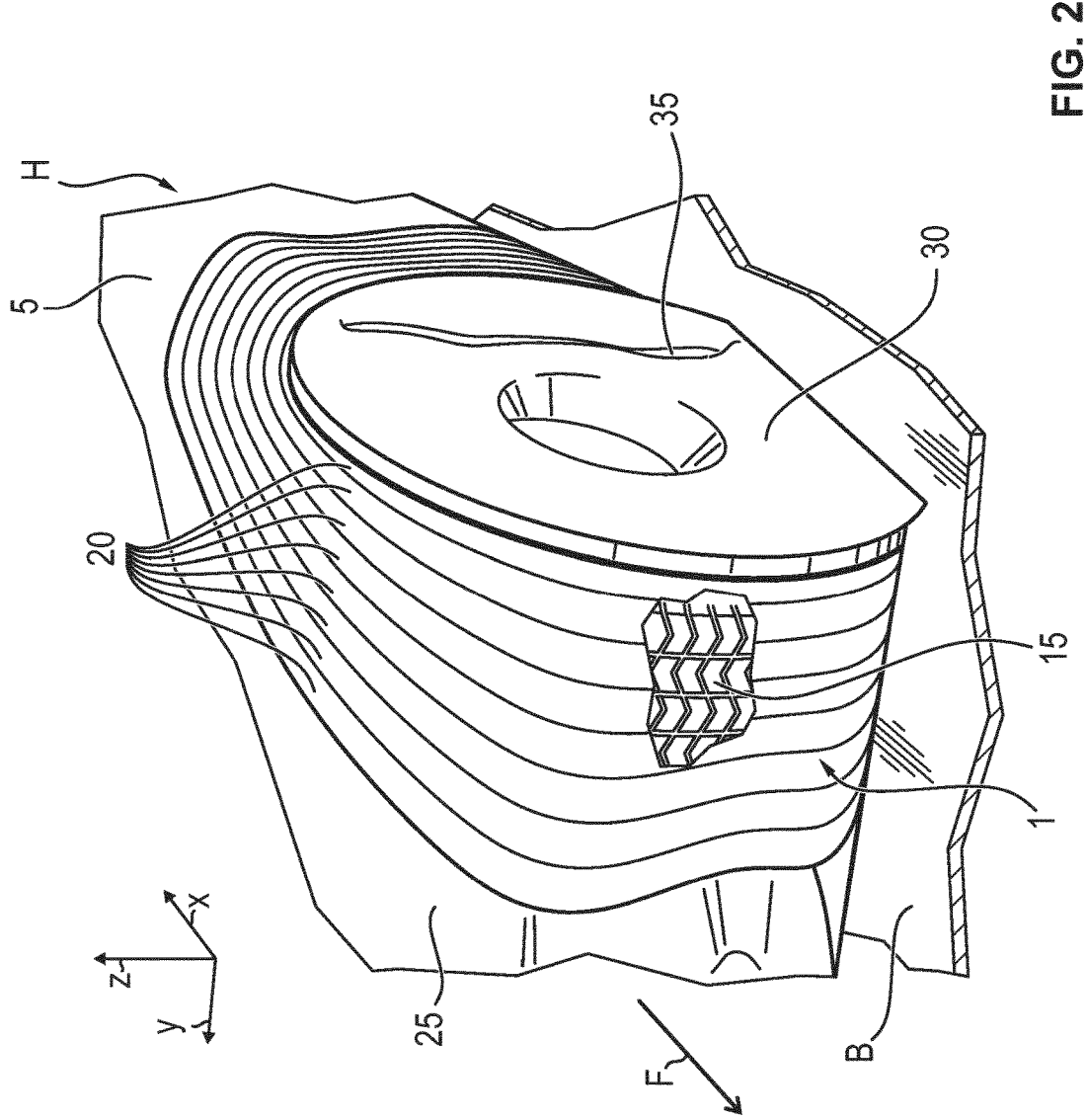
FIG. 2 is a perspective side view of the wheel well cover which is shown in FIG. 1, in a deployed state with a viewing direction toward a rear region of the motor vehicle from the front.

FIG. 2 shows the wheel well cover 1 which is shown in FIG. 1 in a deployed state with a viewing direction toward an indicated rear region H of the motor vehicle 5 from the front, that is to say counter to the main driving direction F. In the exemplary embodiment which is shown here, the wheel 15 is therefore shown in a state which is turned to the left. Accordingly, as viewed in the driving direction F, the front regions of the ring sections 20 in FIG. 2 are likewise deployed to the left. As a result, the visible width of a ring section 20, that is to say its dimension in the y-direction, is greater in the front region of the motor vehicle 5 than in its section which is adjacent with respect to the rear region H. In the case of a wheel 15 which is turned to the right as viewed in the main driving direction F (not shown), the corresponding conditions would be reversed, that is to say the visible width of a wheel section 20 would be smaller in the front region of the motor vehicle 5 than in the rear region H. Overall, the ring sections 20 are therefore configured in such a way that they cover the wheel 15 both in the x-direction and also in the y-direction and z-direction continuously in a manner which is dependent on the wheel angle.

Figure 3:
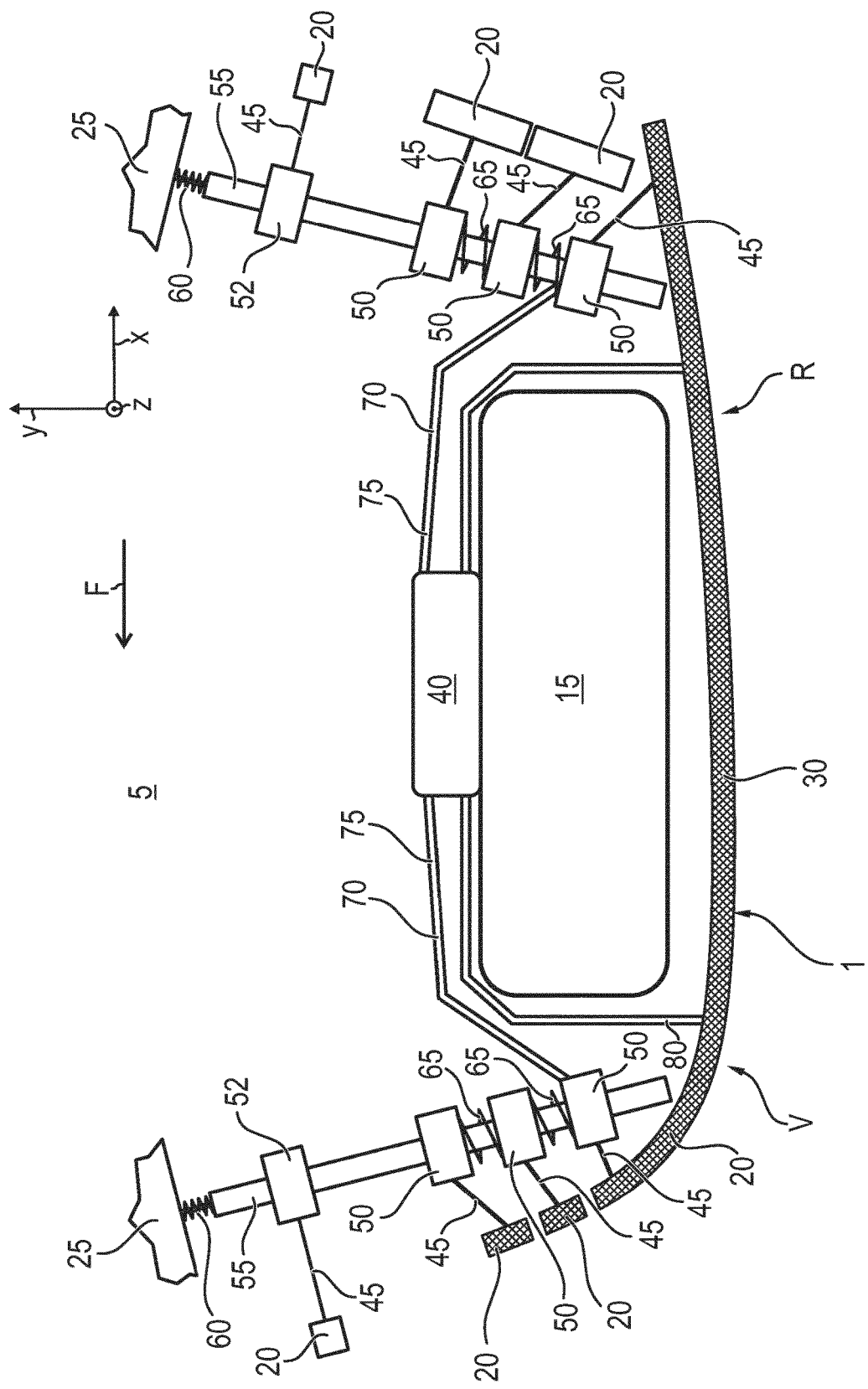
FIG. 3 is a schematic view of a wheel well cover according to an embodiment of the invention in a plan view.

FIG. 3 shows by way of example a symbolic view of a wheel well cover 1 according to the invention in a plan view. The wheel 15 is fastened rotatably to a wheel carrier 40 in a manner known per se. As has been described above, it is covered by way of a series of ring sections 20 (of which merely four are shown here for reasons of clarity) and a wheel spat 30. A movement of the individual ring sections 20 with respect to the wheel 15 and relative to one another is made possible by way of the device which is described in the following.

Each ring section 20 is fastened by way of a retaining member 45 to a guide carriage 50 which, for its part, is mounted displaceably on a guide rail 55. Only a ring section 20 which is closest to the motor vehicle body 25 is provided in a manner which is fixed to the vehicle body by an immovable guide carriage 52. The guide rail 55 itself is fastened to the motor vehicle body 25, it being possible for a damper 60 to be arranged between the guide rail 55 and the motor vehicle body 25 in order to optimize the vibration behavior of the wheel well cover 1. The deploying movement and restoring movement of the wheel well cover 1 are improved further if connecting device 65 are situated between the ring sections 20 which can be displaced relative to one another on the guide rail 55. In order to improve the vibration behavior of the wheel well cover 1, it can be provided that at least a portion of the connecting device 65 are configured as mechanical springs.

In order that the wheel well cover 1 can follow a movement of the wheel 15, at least one actuator 70 is provided which transmits a deploying movement or restoring movement of the wheel 15 to a corresponding movement of the ring sections 20. To this end, in the exemplary embodiment which is shown, a bracket 75 is fastened at one end to the wheel carrier 40 and at the other end to the guide carriage 50. An adjustment of the wheel carrier 40 for the purpose of a deploying movement or a restoring movement of the wheel 15 therefore leads to a displacement of the corresponding guide carriage 50 on the guide rail 55, which guide carriage 50 is closest to the wheel spat 30 in this exemplary embodiment. On account of the provided serial interconnection or connection of the guide carriages 50 among one another, the movement of the wheel carrier 40 is transmitted overall to all the ring sections 20 which are connected to the guide carriages 50.

In principle, the above-described device would be functional in a single embodiment per wheel 15. In order to improve the stability and precision of the wheel well cover 1 according to the invention, however, two corresponding devices are advantageously provided, of which one is situated in the wheel front region V and one is situated in the wheel rear region R (as viewed in the main driving direction F).

In a particularly advantageous way, a wheel well shell 80 which is situated between the wheel 15 and the ring sections 20 can be provided on the wheel well cover 1. The air resistance in the region under consideration here of the wheel well cover 1 and of the motor vehicle 5 which is equipped with it is reduced further by way of said wheel well shell 80. Moreover, any dirt (not shown) which is situated on the wheel 15 and is whirled up by the latter cannot reach the ring sections 20, with the result that the functionality of the wheel well cover 1 according to the invention is improved, in particular, in the case of poor and/or winterly road conditions.

Figure 4:
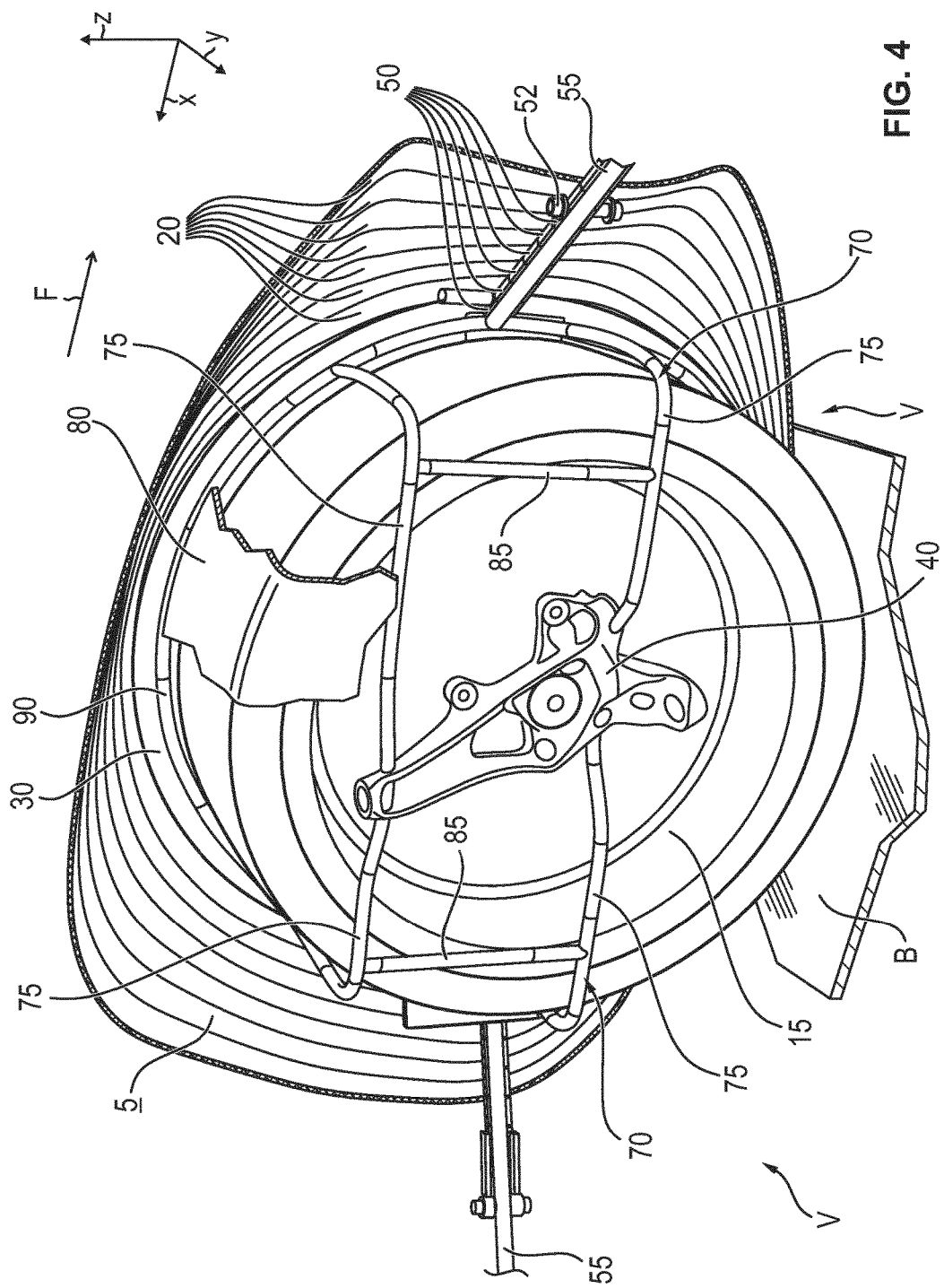
FIG. 4 is a schematic illustration of the wheel well cover according to an embodiment of the invention with a viewing direction from a wheel suspension system in the direction of the vehicle outer side.

FIG. 4 is a schematic illustration of the wheel well cover 1 according to the invention with a viewing direction via the wheel carrier 40 in the direction of the vehicle outer side. As can be gathered from this figure, the wheel 15 is mounted on the motor vehicle 5 in a freely rotatable manner, that is to say it is without contact with respect to all the remaining components (with the exception of the wheel carrier 40). In order that this is made possible even under adverse conditions, in particular at high speeds or in the case of poor road conditions, in addition to a lower bracket 75 which is provided in the x-direction and an upper bracket 75 which is situated above said lower bracket 75, the actuator 70 has in each case one stiffening bow 85 which connects said bracket 75 in the z-direction and is situated in the wheel rear region R and the wheel front region V, respectively. The two brackets 75 for their part are fastened to the wheel carrier 40. On its region which is adjacent with respect to the vehicle outer side, the actuator 70 is provided with a substantially circularly annular section 90 which follows the contour of the wheel 15 and receives the wheel spat 30. It goes without saying here that that section which is adjacent with respect to the roadway surface B, both of the actuator 70 and also of the wheel spat 30 and the ring sections 20, is spaced apart from the roadway surface B itself and is therefore movable with respect to the latter.

Figure 5:
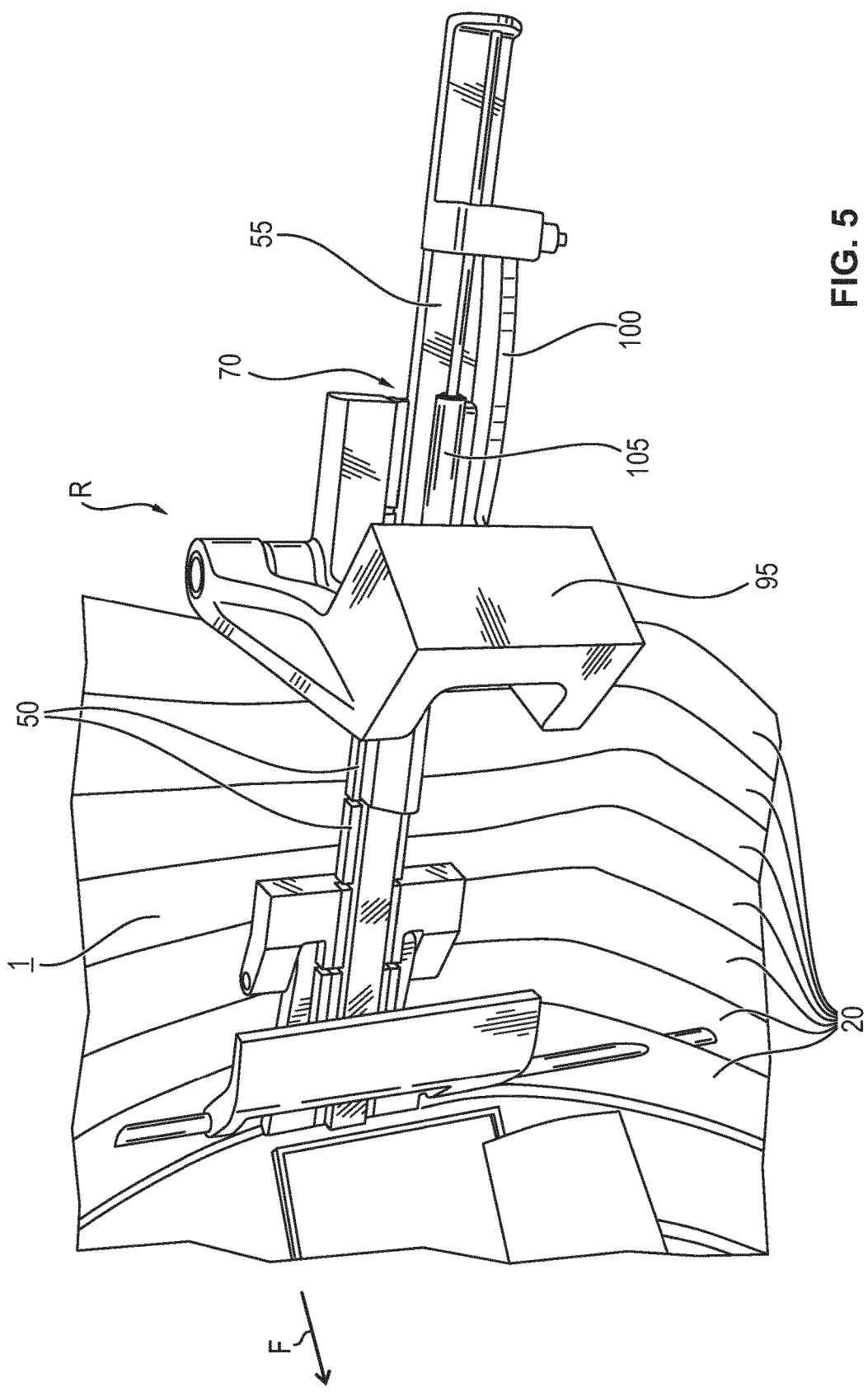
FIG. 5 shows an alternative embodiment of the wheel well cover with a viewing direction from a wheel suspension system in the direction of the rear vehicle outer side.

FIG. 5 shows an alternative embodiment of the wheel well cover 1 with a viewing direction from a wheel suspension system in the direction of the rear vehicle outer side, that is to say into the wheel rear region R, of the motor vehicle 5 according to the invention. A number of ring sections 20 are mounted next to one another such that they can be displaced on a guide rail 55 by means of guide carriages 50. The guide rail 55 itself is mounted pivotably on a joint 95 which is fixed to the vehicle body, with the result that said guide rail 55 can follow a deploying movement or restoring movement of the wheel 15 (not shown here). Moreover, an actuator 75 which has a slotted guide 100 and a prestressing device 105 is provided. The slotted guide 100 guides the wheel well cover precisely in a particularly advantageous way, while any undesired vibrations can be absorbed by the prestressing device 105. Moreover, the prestressing device 105, which is a gas pressure spring in the exemplary embodiment shown here, prestresses the guide carriages 50 in the case of a deploying movement of the wheel, in such a way that they remain lying next to one another on the guide rail 55. As a result, the connecting devices 65 which are disclosed within the context of the earlier-described different embodiment can be dispensed with, which further simplifies the construction of the wheel well cover 1 and further increases its reliability during operation. It is to be noted that an apparatus of corresponding configuration is also present in the wheel front region (not shown here) of the wheel 15. As a result, not only the above-described deploying movement of the ring sections 20 is made possible, but rather also their restoring movement is facilitated, since the respective apparatuses of the above-described type which are situated in the wheel rear region R and wheel front region have a compensating action with respect to one another. This means, in particular, that, in the case of a movement of the wheel to the left as viewed in the main driving direction F, the prestressing device 105 which is shown in FIG. 5 would be relieved to a certain extent, whereas the corresponding prestressing device which is present in the wheel front region would be prestressed. In the case of a restoring movement of the wheel or a deploying movement thereof in the main driving direction F to the right (not shown), in contrast, the prestressing device 105 which is shown in FIG. 5 would be prestressed again. By way of said arrangement, continuous contact of the individual ring sections 20 is made possible in an advantageous way during all driving states of the motor vehicle 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF DESIGNATIONS

1 Wheel well cover
5 Motor vehicle

10 Wheel well
15 Wheel
20 Ring section
25 Motor vehicle body
30 Wheel spat
35 Aerodynamic structure
40 Wheel carrier
45 Retaining member
50 Guide carriage
55 Guide rail
60 Damper
65 Connecting device
70 Actuator
75 Bracket
80 Wheel well shell
85 Stiffening bow
90 Circularly annular section
95 Joint
100 Slotted guide
105 Prestressing device
B Roadway surface
F Main driving direction
H Rear region
R Wheel rear region
V Wheel front region
x,y,z Coordinates of a vehicle's own Cartesian coordinate system

What is claimed is:

1. A wheel well apparatus for a motor vehicle having a motor vehicle body and at least one wheel well for receiving a wheel, comprising:
 a wheel well cover configured so as to be adjusted via an adjusting device, in a manner dependent on a wheel angle, wherein
 the wheel well cover has at least two ring sections which surround the wheel partially and are arranged such that while the wheel well cover is assembled with the wheel, the at least two ring sections are movable at least partially into one another and at least partially relative to one another in a wheel transverse direction dependent on the wheel angle.

2. The wheel well apparatus as claimed in claim 1, wherein
 the ring sections extend in a lateral direction substantially in the wheel transverse direction.

3. The wheel well apparatus as claimed in claim 1, wherein
 in each case, two adjacent ring sections are connected to one another by at least one connecting device.

4. The wheel well apparatus as claimed in claim 3, wherein
 the connecting device is at least one mechanical spring.

5. The wheel well apparatus as claimed in claim 1, wherein
 at least one ring section is mounted on at least one guide.

6. The wheel well apparatus as claimed in claim 5, wherein
 the guide comprises a guide rail which is fastened to the motor vehicle body, and on which a respective ring section is mounted displaceably.

7. The wheel well apparatus as claimed in claim 5, wherein
 a first guide is situated in a wheel front region and a second guide is situated in a wheel rear region.

8. The wheel well apparatus as claimed in claim 5, wherein
 a wheel spat is mounted on the guide.

9. The wheel well apparatus as claimed in claim 1, wherein
 the wheel well cover has a wheel spat which extends on a vehicle body outer side.

10. The wheel well apparatus as claimed in claim 9, wherein
 the wheel spat is connected at least in sections to a ring section.

11. The wheel well apparatus as claimed in claim 9, wherein
 the wheel spat is mounted on a guide on which at least one ring section is mounted.

12. The wheel well apparatus as claimed in claim 9, wherein
 the wheel spat is fastened to a wheel carrier.

13. The wheel well apparatus as claimed in claim 9, wherein
 the wheel spat has an aerodynamic structure, which reduces air resistance, formed as an air duct.

14. The wheel well apparatus as claimed in claim 1, wherein
 the wheel well cover is operatively connected to at least one actuator.

15. The wheel well apparatus as claimed in claim 14, wherein
 the actuator has at least one bracket which is connected at one end on the wheel carrier and at the other end to a ring section.

16. A motor vehicle, comprising a wheel well apparatus as claimed in claim 1.

17. A wheel well apparatus for a motor vehicle having a motor vehicle body and at least one wheel well for receiving a wheel, comprising:
 a wheel well cover configured so as to be adjusted via an adjusting device, in a manner dependent on a wheel angle, wherein
 the wheel well cover has at least three ring sections which surround the wheel partially and are arranged such that the at least three ring sections are movable at least partially into one another and at least partially relative to one another.

* * * * *